US009663653B2

(12) United States Patent
Motegi et al.

(10) Patent No.: US 9,663,653 B2
(45) Date of Patent: May 30, 2017

(54) RESIN COMPOSITION FOR LASER DIRECT STRUCTURING, RESIN MOLDED ARTICLE, AND METHOD FOR MANUFACTURING MOLDED RESIN ARTICLE WITH PLATED LAYER

(71) Applicant: MITSUBISHI ENGINEERING-PLASTICS CORPORATION, Tokyo (JP)

(72) Inventors: Atsushi Motegi, Hiratsuka (JP); Hiroyoshi Maruyama, Hiratsuka (JP)

(73) Assignee: MITSUBISHI ENGINEERING-PLASTICS CORPORATION, Tokyo (JP)

( * ) Notice: Subject to any disclaimer, the term of this patent is extended or adjusted under 35 U.S.C. 154(b) by 579 days.

(21) Appl. No.: 14/241,634

(22) PCT Filed: Sep. 12, 2013

(86) PCT No.: PCT/JP2013/075388
§ 371 (c)(1),
(2) Date: Feb. 27, 2014

(87) PCT Pub. No.: WO2014/042285
PCT Pub. Date: Mar. 20, 2014

(65) Prior Publication Data
US 2015/0111041 A1    Apr. 23, 2015

(30) Foreign Application Priority Data

Sep. 14, 2012  (JP) ................................. 2012-203366

(51) Int. Cl.
| | |
|---|---|
| *C08G 63/02* | (2006.01) |
| *C08L 69/00* | (2006.01) |
| *C08K 13/04* | (2006.01) |
| *C23C 18/16* | (2006.01) |
| *C23C 18/20* | (2006.01) |
| *C23C 18/38* | (2006.01) |

(52) U.S. Cl.
CPC .............. *C08L 69/00* (2013.01); *C08K 13/04* (2013.01); *C23C 18/1641* (2013.01); *C23C 18/204* (2013.01); *C23C 18/38* (2013.01); *C08L 2203/20* (2013.01); *C08L 2205/06* (2013.01); *Y10T 428/31507* (2015.04)

(58) Field of Classification Search
CPC ....................................... C08L 69/00
USPC ....................................... 524/409
See application file for complete search history.

(56) References Cited

U.S. PATENT DOCUMENTS

| | | | | |
|---|---|---|---|---|
| 4,431,764 | A * | 2/1984 | Yoshizumi ................ | C09C 1/00 252/519.33 |
| 6,008,293 | A | 12/1999 | Nakano et al. | |
| 2007/0299174 | A1 | 12/2007 | Chen et al. | |
| 2009/0292048 | A1* | 11/2009 | Li ......................... | C08L 55/02 524/115 |
| 2011/0003128 | A1 | 1/2011 | Isozaki et al. | |
| 2013/0030089 | A1 | 1/2013 | Nakamura et al. | |
| 2014/0248564 | A1 | 9/2014 | Schrauwen | |

FOREIGN PATENT DOCUMENTS

| | | |
|---|---|---|
| CN | 102770491 A | 11/2012 |
| EP | 2 354 185 A1 | 8/2011 |
| JP | 60-88072 A | 5/1985 |
| JP | 5-98142 A | 4/1993 |
| JP | 2007-314766 A | 12/2007 |
| JP | 2008-127485 A | 6/2008 |
| JP | 2009-51989 A | 3/2009 |
| JP | 2011-195820 A | 10/2011 |
| JP | 4880823 B2 | 2/2012 |
| JP | 2012-72338 A | 4/2012 |
| WO | WO 2009/141799 A1 | 11/2009 |
| WO | WO 2011/076729 A1 | 6/2011 |
| WO | WO 2011/076730 A1 | 6/2011 |
| WO | WO 2011/095632 A1 | 8/2011 |
| WO | WO 2012/056416 A1 | 5/2012 |
| WO | WO 2013/183789 A1 | 12/2013 |
| WO | WO 2014/042282 A1 | 3/2014 |

OTHER PUBLICATIONS

International Search Report and Written Opinion of the International Searching Authority, dated Dec. 10, 2013, for International Application No. PCT/JP2013/075388.
European Office Action dated Jun. 4, 2015, for European Application No. 13771226.1.
International Preliminary Report on Patentability and the Written Opinion of the International Search Authority (Forms PCT/IB/326, PCT/IB/373 and PCT/ISA/237) dated Mar. 26, 2015, for International Application No. PCT/JP2013/075388.
International Preliminary Report on Patentability (Forms PCT/IPEA/416 and PCT/IPEA/409), dated Dec. 5, 2014, for International Application No. PCT/JP2013/075387.
International Search Report and Written Opinion of the International Searching Authority (Forms PCT/ISA/220, PCT/ISA/210 and PCT/ISA/237), dated Dec. 10, 2013, for International Application No. PCT/JP2013/075387.

(Continued)

*Primary Examiner* — Terressa Boykin
(74) *Attorney, Agent, or Firm* — Birch, Stewart, Kolasch & Birch, LLP (57) ABSTRACT

Provided is a resin composition capable of achieving a higher plating property. The resin composition comprises, relative to 100 parts by weight of a resin component comprising 30 to 100% by weight of a polycarbonate resin and 70% by weight or less of a styrene-based resin, 10 to 100 parts by weight of a glass filler and 2 to 20 parts by weight of a laser direct structuring additive, wherein the laser direct structuring additive comprises a metal oxide particle comprising titanium oxide coated with a composition comprising tin as a main component and antimony.

17 Claims, 1 Drawing Sheet

(56) References Cited

OTHER PUBLICATIONS

Chinese Office Action and Search Report, issued Oct. 10, 2015, for Chinese Application No. 201380043363.7, along with an English translation of the Chinese Office Action.
Chinese Office Action, dated Apr. 5, 2016, for corresponding Chinese Application No. 201380043363.7.
Notification of First Office Action issued Mar. 24, 2015, in Chinese Patent Application No. 201380011867.0, with English translation.
Machine translation of JP 5-98142 (1993).
Machine translation of JP 60-88072 (1985).
Non-Final Office Action issued Jan. 27, 2017, in U.S. Appl. No. 14/419,889.

* cited by examiner

RESIN COMPOSITION FOR LASER DIRECT STRUCTURING, RESIN MOLDED ARTICLE, AND METHOD FOR MANUFACTURING MOLDED RESIN ARTICLE WITH PLATED LAYER

TECHNICAL FIELD

The present invention relates to a resin composition for laser direct structuring (hereinafter may be simply referred to as "resin composition"). Furthermore, the present invention relates to a resin molded article produced by molding the resin composition, and a method for manufacturing a resin molded article with a plated layer in which the plated layer is formed, on the surface of the resin molded article.

BACKGROUND ART

Recently, along with the development of cellular phones including smart phone, various methods for manufacturing an antenna inside the cellular phone have been studied. Particularly, a method for manufacturing the antenna which can be three-dimensionally designed inside the cellular phones is required. As one of the techniques for forming the three-dimensional antenna, attention to laser direct structuring (hereinafter may be referred to as "LDS") technique has been paid. The LDS technique is a technique, for example, where the irradiation of a surface of a resin molded article containing an LDS additive with a laser activates only the laser-irradiated portion, and then application of a metal to the activated portion causes a plated layer to form. The feature of this technique is to be capable of manufacturing a metallic structure such as an antenna directly on a surface of resin substrate without using adhesives or the like. Such LDS techniques are disclosed, for example, in WO2011/095632 A, WO2011/076729 A, and WO2011/076730 A.

SUMMARY OF INVENTION

Technical Problem

Here, along with the advancement of the LDS technique, there is required a resin composition capable of achieving a higher plating property. An object of the present invention is to solve the problems of the conventional technique, and is to provide a resin composition capable of achieving a higher plating property.

Solution to Problem

Under such circumstances, as a result of intensive studies by the present inventors, it has been found that when a metal oxide particle comprising titanium oxide coated with a composition comprising tin oxide and antimony as a laser direct structuring additive (hereinafter may be referred to as LDS additive) is used, a resin composition for LDS having an excellent plating property can be provided, and then the present invention has been completed. Specifically, the above-mentioned problems have been solved by the means <1>, preferably by <2> to <15>, mentioned below.
<1> A resin composition for laser direct structuring, comprising, relative to 100 parts by weight of a resin component comprising 30 to 100% by weight of a polycarbonate resin and 70% by weight or less of a styrene-based resin, 10 to 100 parts by weight of a glass filler and 2 to 20 parts by weight of a laser direct structuring additive, wherein the laser direct structuring additive comprises a metal oxide particle comprising titanium oxide coated with a composition comprising tin as a main component and antimony.
<2> The resin composition for laser direct structuring according to <1>, wherein the composition is a composition comprising 50% by weight or more of tin and 1 to 30% by weight of antimony, as a metal component.
<3> The resin composition for laser direct structuring according to <1> or <2>, wherein the laser direct structuring additive comprises 70 to 95% by weight of tin oxide and 5 to 30% by weight of antimony oxide.
<4> The resin composition for laser direct structuring according to any one of <1> to <3>, wherein a content of titanium oxide in the metal oxide particle comprising titanium oxide is 90% by weight or more.
<5> The resin composition for laser direct structuring according to any one of <1> to <4>, wherein the glass filler is a glass fiber having an average fiber length of 200 µm or less.
<6> The resin composition for laser direct structuring according to any one of <1> to <5>, wherein the glass filler is coated with at least one sizing agent selected from a polyolefin resin and a silicone resin.
<7> The resin composition for laser direct structuring according to any one of <1> to <6>, comprising styrene resin in an amount of 10% by weight or more as a resin component.
<8> The resin composition for laser direct structuring according to any one of <1> to <7>, further comprising an elastomer and/or a phosphorus-based stabilizer.
<9> A resin-molded article obtained by molding the laser direct structuring composition according to any one of <1> to <8>.
<10> The resin-molded article according to <9>, further comprising a plated layer on a surface of the article.
<11> The resin-molded article according to <9> or <10>, which is a mobile electronic device part.
<12> The resin-molded article according to <10> or <11>, wherein the plated layer has a performance as an antenna.
<13> A method for manufacturing a resin-molded article with a plated layer, comprising irradiating the surface of a resin-molded article, obtained by molding the thermoplastic resin composition according to any one of <1> to <8>, with a laser, and then applying a metal to form the plated layer.
<14> The method for manufacturing a resin-molded article with a plated layer according to <13>, wherein the plating is copper plating.
<15> A method for manufacturing a mobile electronic device part having an antenna, comprising the method for manufacturing a resin-molded article with a plated layer according to <13> or <14>.

Effects of the Invention

According to the present invention, it is possible to provide a resin composition having an excellent plating property.

BRIEF DESCRIPTION OF DRAWINGS

In FIG. 1, numeral 1 designates a resin molded article, 2 designates a laser, 3 designates a portion where irradiation with the laser is performed, 4 designates a plating solution, 5 designates a plated layer, respectively.

DESCRIPTION OF EMBODIMENTS

Hereinafter, the content of the present invention will be specifically explained. Meanwhile, in the present Description, the expression "to" is used to mean that the former numerical value and the latter numerical value are included as an upper limit value and a lower limit value, respectively.

A resin composition according to the present invention is characterized by comprising, relative to 100 parts by weight of a resin component comprising 30 to 100% by weight of a polycarbonate resin and 70% by weight or less of a styrene-based resin, 10 to 100 parts by weight of a glass filler and 2 to 20 parts by weight of a laser direct structuring additive, wherein the laser direct structuring additive comprises a metal oxide particle comprising titanium oxide coated with a composition comprising tin as a main component and antimony. According to this formulation, a higher plating property can be achieved. Furthermore, there can be provided a resin composition having excellent mechanical properties, low dielectric constant, excellent hue, and being hard to be decomposed.

Hereinafter, the resin composition according to the present invention will be explained in detail.

Polycarbonate Resin

The polycarbonate resin used in the present invention is not particularly limited, and there can be used any of an aromatic polycarbonate, an aliphatic polycarbonate, an aromatic-aliphatic polycarbonate. Among them, the aromatic polycarbonate is preferable, and more preferable is a thermoplastic aromatic polycarbonate polymer or copolymer obtained by causing an aromatic dihydroxy compound to react with phosgene or a diester of carbonic acid.

The aromatic dihydroxy compounds include 2,2-bis(4-hydroxyphenyl)propane (=bisphenol A), tetramethylbisphenol A, bis(4-hydroxyphenyl)-P-diisopropylbenzene, hydroquinone, resorcinol, 4,4-dihydroxydiphenyl, etc., and preferable is bisphenol A. Furthermore, in order to prepare a composition having high incombustibility, there can be used a compound in which one or more of a tetraalkylphosphonium sulfonate is bonded to the above-mentioned aromatic dihydroxy compound, or a polymer, oligomer or the like containing siloxane structure and having phenolic OH groups at both ends.

Preferred polycarbonate resins used in the present invention comprise a polycarbonate resin derived from 2,2-bis(4-hydroxyphenyl)propane; and a polycarbonate copolymer derived from 2,2-bis(4-hydroxyphenyl)propane and other aromatic dihydroxy compound.

A molecular weight of the polycarbonate resin is a viscosity-average molecular weight converted from a viscosity of solution at a temperature of 25° C. when using methylene chloride as a solvent, and is preferably 14,000 to 30,000, more preferably 15,000 to 28,000, and further preferably 16,000 to 26,000. When the viscosity-average molecular weight is within the above-mentioned range, mechanical strength is good and moldability is also good, which is thus preferable.

Method for preparing the polycarbonate resin is not particularly limited, and in the present invention, there can be used polycarbonate resins manufactured by any methods such as phosgene method (interfacial polymerization method) and melting method (interesterification method). In addition, in the present invention, there maybe used a polycarbonate resin manufactured through a process in which an amount of end OH groups is controlled after undergoing manufacturing process by the general melting method.

Moreover, the polycarbonate resin used in the present invention may be not only a polycarbonate resin as a virgin material, but also a polycarbonate resin recycled from used products, so called a polycarbonate resin materially recycled.

As to other polycarbonate resins used in the present invention, the description of, for example, paragraphs 0018 to 0066 of JP 2012-072338 A can be referred to, which is incorporated hereto.

The resin composition of the present invention may comprise only one kind of the polycarbonate resin, or may comprise two or more kinds.

In the resin composition of the present invention, a proportion of the polycarbonate resin in the whole resin components is preferably 30 to 100% by weight, more preferably 45 to 75% by weight, and further preferably 52 to 70% by weight.

Styrene-Based Resin

The resin composition of the present invention may comprise a styrene-based resin other than the polycarbonate resin, as resin components.

The styrene-based resin refers to at least one polymer selected from the group consisting of a styrene-based polymer comprising a styrene-based monomer; a copolymer of the styrene-based monomer and the other copolymerizable vinyl monomer; a polymer obtained by polymerizing styrene-based monomers, or by copolymerizing styrene-based monomers and other polymerizable vinyl monomers copolymerizable with the styrene-based monomer, in the presence of a rubber-like polymer. Among them, it is preferable to use the copolymer obtained by copolymerizing the styrene-based monomers or the copolymer of the styrene-based monomer and the other copolymerizable vinyl monomer, in the presence of a rubber-like polymer.

Specific examples of the styrene-based monomers include styrene, a styrene derivative such as α-methylstyrene, p-methylstyrene, divinylbenzene, ethylvinylbenzene, dimethylstyrene, p-t-butylstyrene, bromostyrene, or dibromostyrene, and among them, styrene is preferable. Meanwhile, these may be used alone or in the mixture of two or more of them.

Examples of the vinyl-based monomer copolymerizable with the above-mentioned styrene-based monomer include a vinyl cyan compound such as acrylonitrile or methacrylonitrile, an alkyl ester of acrylic acid such as methyl acrylate, ethyl acrylate, propyl acrylate, butyl acrylate, amyl acrylate, hexyl acrylate, 2-ethylhexyl acrylate, octyl acrylate or cyclohexyl acrylate, an alkyl ester of methacrylic acid such as methyl methacrylate, ethyl methacrylate, propyl methacrylate, butyl methacrylate, amyl methacrylate, hexyl methacrylate, 2-ethylhexyl methacrylate, octyl methacrylate or cyclohexyl methacrylate, an aryl ester of acrylic acid such as phenyl acrylate or benzyl acrylate, an aryl ester of methacrylic acid such as phenyl methacrylate or benzyl methacrylate, an epoxy-containing acrylic ester or metacrylic ester such as glycidyl acrylate or glycidyl methacrylate, a maleimide-based monomer such as maleimide, N,N-methyl maleimide or N-phenyl maleimide, an α,β-unsaturated carboxylic acid or acid anhydride thereof such as acrylic acid, methacrylic acid, maleic acid, maleic acid anhydride, fumaric acid or itaconic acid, and the like.

In addition, examples of the rubber-like polymer copolymerizable with the styrene-based monomer include polybutadiene, polyisoprene, styrene-butadiene random copolymer and block copolymer, acrylonitrile-butadiene random copolymer and block copolymer, acrylonitrile-butadiene copolymer, a copolymer of butadiene and an alkyl ester of acrylic acid or an alkyl ester of methacrylic acid, polybutadiene-polyisoprene diene-based copolymer, a copolymer of ethylene and an α-olefin such as ethylene-isoprene random copolymer and block copolymer or ethylene-butene random copolymer and block copolymer, a copolymer of ethylene and an α,β-unsaturated carboxylic acid ester such as ethylene-methacrylate copolymer or ethylene-butyl acrylate copolymer, ethylene-vinyl acetate copolymer, an ethylene-propylene-unconjugated diene terpolymer such as ethylene-propylene-hexadiene copolymer, acryl rubber, a composite rubber composed of polyorganosiloxane rubber and a polyalkyl acrylate or methacrylate rubber, and the like.

Examples of such styrene-based resins include, for example, polystyrene resin, high impact polystyrene resin (HIPS), acrylonitrile-styrene copolymer (AS resin), acrylonitrile-butadiene-styrene copolymer (ABS resin), methyl methacrylate-acrylonitrile-butadiene-styrene copolymer (MABS resin), acrylonitrile-styrene-acrylic rubber copolymer (ASA resin), acrylonitrile-ethylenepropylene based rubber-styrene copolymer (AES resin), styrene-methyl methacrylate copolymer (MS resin), styrene-maleic acid anhydride copolymer and the like.

Among them, preferable is acrylonitrile-styrene copolymer (AS resin), acrylonitrile-butadiene-styrene copolymer (ABS resin), acrylonitrile-styrene-acrylic rubber copolymer (ASA resin) or acrylonitrile-ethylenepropylene based rubber-styrene copolymer (AES resin), more preferable is acrylonitrile-butadiene-styrene copolymer (ABS resin), acrylonitrile-styrene-acrylic rubber copolymer (ASA resin) or acrylonitrile-ethylenepropylene based rubber-styrene copolymer (AES resin), particularly preferable is acrylonitrile-butadiene-styrene copolymer (ABS resin).

The above-mentioned styrene-based resin is prepared by a method such as emulsion polymerization, solution polymerization, mass polymerization, suspension polymerization or mass-suspension polymerization, but in the present invention, in the case of so-called styrene-based polymer, or the styrene-based random copolymer of block copolymer, a styrene-based resin prepared by mass polymerization, suspension polymerization or mass-suspension polymerization is suitable, and in the case of the styrene-based graft copolymer, a styrene-based resin prepared by mass polymerization, mass-suspension polymerization or emulsion polymerization is suitable.

In the present invention, the acrylonitrile-butadiene-styrene copolymer (ABS resin) particularly favorably used is a mixture of a thermoplastic graft copolymer prepared by grafting acrylonitirile and styrene to a butadiene rubber component, and a copolymer of acrylonitirile and styrene. The butadiene rubber component is preferably 5 to 40% by weight in 100% by weight of the ABS resin component, more preferably 10 to 35% by weight, and particularly preferably 13 to 25% by weight. In addition, the rubber particle size is preferably 0.1 to 5 μm, more preferably 0.2 to 3 μm, further preferably 0.3 to 1.5 μm, and particularly preferably 0.4 to 0.9 μm. The distribution of the rubber particle size may be any of a uniform distribution or be a plurality of distributions having two or more peaks.

The resin composition of the present invention may comprise only one kind of the styrene-based resin, or may comprise two or more kinds.

In the resin composition of the present invention, a proportion of the styrene-based resin in the whole resin components is preferably 70% by weight or less, more preferably 55% by weight or less, and further preferably 45% by weight or less. In addition, a proportion of the styrene-based resin in the whole resin components is preferably 10% by weight or more, and more preferably 30% by weight or more.

Furthermore, the resin composition of the present invention may comprise other resin component within a scope not departing the gist of the present invention. However, the other resin is preferably 5% by weight or less in the whole resin components.

In the resin composition of the present invention, the resin components is preferably 60% by weight or more of the total of the composition, more preferably 70% by weight or more.

Glass Filler

The resin composition of the present invention comprises a glass filler. The glass filler includes glass fiber, plate-like glass, glass beads, glass flake, and preferable is glass fiber.

The glass filler is made up of glass composition such as A glass, C glass, E glass, and S glass and particularly, the E glass (no alkaline glass) is preferable because it does not have an adverse effect on the polycarbonate resin.

The glass fiber refers to a material which has a perfect circular or polygonal cross-sectional shape cut at right angles to the longitudinal direction and has a fibrous appearance.

The glass fiber used in the resin composition of the present invention may be a monofilament or a plurality of monofilament twisted threads.

The shape of the glass fibers may be any of "glass roving" obtained by winding continuously a monofilament or a plurality of monofilament twisted threads, "chopped strand" cut at a length of 1 to 10 mm, or "milled fiber" milled to powder having a length of about 10 to 500 μm. Such glass fibers can be commercially manufactured by ASAHI FIBER GLASS Co., Ltd. as a trade name of "Glasslon Chopped Strand" or "Glasslon Milled Fiber", and can be easily obtained. The glass fibers of different shapes can also be used together.

In addition, according to the present invention, a glass fiber having an irregular cross-sectional shape is also preferable. This irregular cross-sectional profile means that, when a longer diameter and a shorter diameter of a cross section perpendicular to a fiber length are assumed to be D2 and D1, respectively, a flattening ratio represented by a ratio of longer diameter/shorter diameter (D2/D1) is, for example, preferably 1.5 to 10, more preferably 2.5 to 10, further preferably 2.5 to 8, and particularly preferably 2.5 to 5. This flat glass fiber is referred to the description of Paragraphs 0065 to 0072 of JP 2011-195820 A, which are incorporated herein.

The glass bead is a spherical bead having an outer diameter of 10 to 100 μm, and for example, is easily commercially available from Potters-Ballotini Co., Ltd. as a trade name of "EGB731". In addition, the glass flake is a scale-like one having a thickness of 1 to 20 μm and a length of one side of 0.05 to 1 mm, and for example, is easily commercially available from Nippon Sheet Glass Co., Ltd. as a trade name of "FLEKA".

As the first embodiment further enhancing a plating property of the resin composition of the present invention, there is exemplified an embodiment using a glass fiber having an average fiber length of 200 μm or less. The average fiber length of the glass fiber used in this embodiment is, from a viewpoint of enhancement of plating property, preferably 200 μm or less, more preferably 150 μm or less, and further preferably 120 μm or less. In addition, the lower limit is preferably 5 μm or more, more preferably 7 μm or more, and further preferably 15 μm or more. In addition, an average fiber diameter of the glass fiber is preferably 5 to 15 μm, more preferably 7 to 15 μm, and particularly preferably 9 to 15 μm. When the average fiber diameter is less than 5 μm, there may be a case where a moldability of the polycarbonate resin composition is impaired, and when the average fiber diameter exceeds 15 μm, there is a case where an appearance of the resin molded article is impaired and reinforcing effect is not sufficient. Meanwhile, in the present invention, the average fiber diameter is a weight average fiber diameter.

A blending amount of the glass filler in the resin composition of the present invention is 10 to 100 parts by weight, preferably 10 to 85 parts by weight, more preferably 20 to 70 parts by weight, further preferably 30 to 65 parts by weight, and particularly preferably 40 to 60 parts by weight relative to 100 parts by weight of the resin component. By blending the glass filler, the mechanical strength can be enhanced and also plating property tend to be enhanced.

The resin composition of the present invention may comprise only one kind of the glass filler, or may comprise two or more kinds. When comprising two or more of them, it is preferable that a total amount is within the above-mentioned range.

Sizing Agent

The glass filler to be blended with the resin composition of the present invention is preferably coated with a sizing agent. A kind of the sizing agent is not particularly defined. The sizing agent may be used only one kind or may be used in combination of two or more kinds. As the second embodiment further enhancing a plating property of the resin composition of the present invention, there is exemplified an embodiment in which at least one sizing agent selected from an epoxy-based sizing agent, an urethane-based sizing agent, a polyolefin-based sizing agent, and a silicone-based sizing agent, and more preferable sizing agent are polyolefin-based sizing agent and silicone-based sizing agent. Such a sizing agent has a poor adhesion property to the resin component of the present invention comprising the polycarbonate resin. Therefore, in case of the resin composition comprising such a glass filler, a clearance is formed between the glass filler and the resin component, and a plating solution enters the clearance, which makes it possible to enhance the plating property.

Furthermore, in order to further enhance the plating property of the resin composition of the present invention, the first embodiment and the second embodiment may be combined.

Examples of the polyolefin resins to be used as the sizing agent according to the present embodiment include polyethylene resin, polypropylene resin, a coating agent comprising a polyolefin described in Japanese Patent No. 4880823, and the like. Among them, from the viewpoint of adhesion property, polyethylene is preferable. Examples of the silicone resins include acrylsilane resin, a coating agent comprising a polyorganosiloxane described in Japanese Patent No. 4880823, and the like. The polyolefin resin and/or the silicone resin may be formed of a single monomer or may be a copolymer formed of a plurality of different monomers.

An amount of the sizing agent in the resin composition of the present invention is preferably 0.1 to 5.0% by weight of the glass filler, more preferably 0.2 to 2.0% by weight.

Laser Direct Structuring Additive

The LDS additive used in the present invention comprises a metal oxide particle comprising titanium oxide which is coated with a composition comprising tin as a main component and antimony (hereinafter may be referred to as coating composition). By coating the metal oxide particle with the coating composition, a plating property can be enhanced.

The LDS additive used in the present invention refers to a compound in which a plated layer can be formed when adding 4 parts by weight of an additive to be considered as a LDS additive relative to 100 parts by weight of polycarbonate resin (Tupilon (registered trademark) S-3000F manufactured by Mitsubishi Engineering Plastics Co., Ltd.), performing irradiation with YAG laser having a wavelength of 1064 nm under output power of 10 W, frequency of 80 kHz and rate of 3 m/s, and then subjecting the laser-irradiated surface as metal, to a plating process in an electroless plating bath of M-Copper85 manufactured by MacDermid Co., Ltd. The LDS additive to be used in the present invention may be a synthetic product or a commercially available product. Furthermore, the commercially available product may be a product being commercial product sold as a LDS additive, or maybe a material which is sold for other use as long as the requirements of the LDS according to the present invention is satisfied.

The metal oxide particle comprises titanium oxide, and an amount of titanium oxide is preferably 90% by weight or more, more preferably 95% by weight or more, and further preferably 99% by weight or more.

The metal oxide particle may comprise a metal other than titanium oxide. Examples of the metals other than titanium oxide include indium, iron, cobalt, nickel, zinc, cadmium, silver, bismuth, arsenic, manganese, chromium, magnesium, calcium, and the like. These metals may exist in the form of oxide. The content of those metals is preferably 0.01% by weight or less.

In the metal components contained in the coating composition, tin preferably occupies 50% by weight or more, more preferably 60 to 0% by weight. Antimony is preferably 1 to 30% by weight, more preferably 1 to 20% by weight. When tin contained in the coating composition is an oxide, the tin oxide in the coating composition is preferably 70 to 95% by weight, further preferably 80 to 90% by weight. When antimony contained in the coating composition is an oxide, the antimony oxide in the coating composition is preferably 5 to 30% by weight, more preferably 10 to 20% by weight.

Furthermore, the coating composition may comprise other metals other than lead and copper. Examples of the other metals include lead, copper, indium, iron, cobalt, nickel, zinc, cadmium, silver, bismuth, arsenic, manganese, chromium, magnesium, calcium, and the like. These metals may exist in the form of oxide. The content of these metals is preferably 0.001% by weight or less of the metal components contained in the coating composition, respectively.

The LDS additive may be coated with the coating composition on a part of the surface of the metal oxide particle, or may be coated with the coating composition on the whole of the surface.

A weight ratio of the metal oxide particle and the coating composition (metal oxide particle: coating composition) is preferably 90:10 to 60:40, more preferably 85:15 to 75:25.

A particle size of the LDS additive is preferably 0.01 to 50 μm, more preferably 0.05 to 30 μm. With such a configuration, uniformity of plated surface condition tends to be good when applying plating.

A lending amount of the LDS additive in the resin composition of the present invention is 2 to 20 parts by weight, preferably 3 to 15 parts by weight, and more preferably 5 to 12 parts by weight relative to 100 parts by weight of the resin component. In addition, by blending of a talc, a sufficient plating property can be achieved even when a blending amount of the LDS additive is regulated to be a small amount (for example, 3 to 7 parts by weight relative to 100 parts by weight of the resin component).

The resin composition of the present invention may comprise only one kind of the LDS additive, or may comprise two or more kinds. When comprising two or more, it is preferable that a total amount is within the above-described range.

Talc

The resin composition of the present invention may comprise a talc. In the present invention, by blending the talc, plating performance at the portion irradiated with laser tends to be increased.

In addition, the talc used in the present invention is preferable to be a talc surface-treated with at least one of a compound selected from polyorganohydrogensiloxanes and organopolysiloxanes. In this case, an adhesion amount of the siloxane compound is preferably 0.1 to 5% by weight of the talc. The siloxane compound will be explained specifically in the following.

When the resin composition of the present invention contains the talc, a blending amount of the talc is preferably 1 to 30 parts by weight, and more preferably 2 to 10 parts by weight relative to 100 parts by weight of the resin component. When the talc is surface-treated, it is preferable that a total amount of the surface-treated talc is within the above-mentioned range.

Elastomer

It is also preferable that the resin composition of the present invention comprises an elastomer. By blending the elastomer, an impact resistance of the resin composition can be enhanced.

The elastomer used in the present invention is preferably a graft copolymer prepared by graft-copolymerizing a rubber component with a copolymerizable monomer component. Preparation method of the graft copolymer may be anyone of mass polymerization, solution polymerization, suspension polymerization, emulsion polymerization, and the like, and copolymerization system may be one-stage grafting or multi-stage grafting.

The rubber component has a glass transition temperature of usually 0° C. or less, more preferably −20° C. or less, further preferably −30° C. or less. Specific examples of the rubber component include polybutadiene rubber, polyisoprene rubber, a polyalkyl acrylate rubber such as polybutyl acrylate, poly(2-ethylhexyl acrylate), or copolymer of butyl acrylate and 2-ethylhexyl acrylate, a silicone-based rubber such as polyorganosiloxane rubber, butadiene-acryl composite rubber, IPN (Interpenetrating Polymer Network) type composite rubber composed of polyorganosiloxane rubber and polyalkyl acrylate rubber, styrene-butadiene rubber, an ethylene-α-olefin-based rubber such as ethylene-propylene rubber, ethylene-butene rubber or ethylene-octene rubber, ethylene-acryl rubber, fluororubber, and the like. These may be used alone or in combination of two or more of them. Among them, from the viewpoint of mechanical properties and surface appearance, preferable are polybutadiene rubber, polyalkyl acrylate rubber, polyorganosiloxane rubber, IPN type composite rubber composed of polyorganosiloxane rubber and polyalkyl acrylate rubber, styrene-butadiene rubber.

Specific examples of the monomer component graft-copolymerizable with the rubber component include an aromatic vinyl compound, a vinyl cyanide compound, an ester compound of (meth)acrylic acid, a (meth)acrylic acid compound, an ester compound of an epoxy-containing (meth)acrylic acid such as glycidyl (meth)acrylate; a maleimide compound such as maleimide, N-methylmaleimide, or N-phenylmaleimide; an α,β-unsaturated carboxylic acid compound such as maleic acid, phthalic acid, or itaconic acid, and an acid anhydride thereof (for example maleic acid anhydride, and the like), and the like. These monomers may be used alone or in combination of two or more of them. Among them, from the viewpoint of mechanical properties and surface appearance, preferable are an aromatic vinyl compound, a vinyl cyanide compound, an ester compound of (meth)acrylic acid, a (meth)acrylic acid compound, and more preferable is an ester compound of (meth)acrylic acid. Specific examples of the ester compound of (meth)acrylic acid include methyl (meth)acrylate, ethyl (meth)acrylate, butyl (meth)acrylate, cyclohexyl (meth)acrylate, octyl (meth)acrylate, and the like.

In view of impact resistance and surface appearance, the graft copolymer which is copolymerized with the rubber component is preferably a core/shell type graft copolymer. Among them, particularly preferable is a core/shell type graft copolymer which is composed of a core layer of at least one of the rubber component selected from polybutadiene-containing rubber, polybutyl acrylate-containing rubber, polyorganosiloxane rubber and IPN type composite rubber composed of polyorganosiloxane rubber and polyalkyl acrylate rubber, and a shell layer which is formed around the core by copolymerizing a (meth)acrylic acid ester. In the above-mentioned core/shell type graft copolymer, a content of the rubber component is preferably 40% by mass or more, more preferably 60% by mass or more. A content of the (meth)acrylic acid is preferably 10% by mass or more. In the present invention, the core/shell type is not necessary to exactly distinguish the core layer from the shell layer, and has a concept that includes compounds obtainable by graft-polymerizing the rubber component around the core portion.

Preferable examples of the core/shell type graft copolymer include methyl methacrylate-butadiene-styrene copolymer (MBS), methyl methacrylate-acrylonitrile-butadiene-styrene copolymer (MABS), methyl methacrylate-butadiene copolymer (MB), methyl methacrylate-acryl rubber copolymer (MA), methyl methacrylate-acryl rubber-styrene copolymer (MAS), methyl methacrylate-acryl butadiene rubber copolymer, methyl methacrylate-acryl butadiene rubber-styrene copolymer, methyl methacrylate-(acryl silicone IPN rubber) copolymer, and the like. These rubber-like polymers may be used alone or in combination of two or more of them.

Examples of the elastomer include, for instance, "PARALOID (registered trademark, hereinafter the same) EXL2602", "PARALOID EXL2603", "PARALOID EXL2655", "PARALOID EXL2311", "PARALOID EXL2313", "PARALOID EXL2315", "PARALOID KM330", "PARALOID KM336P", "PARALOID KCZ201" manufactured by Rohm and Haas Japan Company, "METABLEN (registered trademark, hereinafter the same) C-223A", "METABLEN E-901", "METABLEN S-2001", "METABLEN SRK-200" manufactured by MITSUBISHI RAYON Co., Ltd., KANEACE (registered trademark, hereinafter the same) M-511, "KANEACE M-600", "KANEACE M-400", "KANEACE M-580", "KANEACE M-711", "KANEACE MR-01" manufactured by KANEKA CORPORATION, "UBESTA XPA" manufactured by UBE INDUSTRIES LTD, and the like.

When the resin composition of the present invention contains an elastomer, a blending amount of the elastomer is 1 to 20 parts by weight, preferably 1 to 15 parts by weight, more preferably 3 to 10 parts by weight relative to 100 parts by weight of the resin component.

The resin composition of the present invention may comprise only one kind of the elastomer, or may comprise two or more kinds. When comprising two or more of them, it is preferable that a total amount is within the above-mentioned range.

White Pigment

The resin composition of the present invention may comprise a white pigment. In the present invention, by adding the white pigment, coloring of the resin-molded article can be achieved. Examples of the white pigments include ZnS, ZnO, titanium oxide, and preferable are zinc sulfide and titanium oxide.

The titanium oxide is preferably one which contains titanium oxide in an amount of 80% by weight or more among commercially available ones in view of whiteness and covering property. Examples of the titanium oxide used in the present invention include titanium monoxide (TiO), dititanium trioxide ($Ti_2O_3$), titanium dioxide ($TiO_2$), and the like, and any of them can be used, preferable is titanium dioxide. As the titanium oxide, there may be used one having the rutile type crystalline structure.

An average primary particle size of the white pigment is preferably 1 μm or less, more preferably within a range of from 0.001 to 0.5 μm, further preferably within a range of from 0.002 to 0.1 μm. By controlling the average particle size of the white pigment within such a range and an amount thereof within the following range, it is possible to obtain a resin composition which produces a molded article having a high whiteness and high surface reflectance.

When using an inorganic pigment as the white pigment, a surface-treated pigment may be used. The white pigment used in the present invention is preferably a white pigment which is surface-treated with at least one of the siloxane compound. In the case, an adhesion amount of the siloxane compound is preferably 0.1 to 5% by weight of the white pigment. As to the siloxane compound, the explanation of the above-mentioned polyorganohydrogensiloxanes and organopolysiloxanes can be referred to, and the preferred ranges are also the same.

As a preferred embodiment of the present invention, there is exemplified a formulation using a titanium oxide surface-treated with at least one kind selected from polyorganohydrogensiloxanes and organopolysiloxanes.

As the white pigment, commercially available pigments can be used. Furthermore, it may be possible to use one obtained by grinding appropriately a massive pigment or a pigment with large average particle size, and classifying the pigment with a sieve or the like, if necessary, so as to be within the above-mentioned average particle size When the resin composition of the present invention comprises the white pigment, a blending amount of the white pigment is preferably 0.1 to 10 parts by weight, more preferably 1 to 8 parts by weight, and further preferably 2 to 5 parts by weight relative to 100 parts by weight of the resin component.

The polycarbonate resin composition of the present invention may comprise only one kind of the white pigment, or may comprise two or more kinds. When comprising two or more of them, it is preferable that a total amount is within the above-mentioned range.

Phosphorus-Based Stabilizer

The resin composition of the present invention preferably comprises a phosphorus-based stabilizer.

As the phosphorus-based stabilizer, a phosphoric acid ester and a phosphorous acid ester are preferable.

As the phosphoric acid ester, the compound represented by the following general formula (3) is preferable.

General formula (3)

$$O=P(OH)_m(OR)_{3-m} \quad (3)$$

in the general formula (3), R is an alkyl group or an aryl group, and may be the same or different. m is an integer of 0 to 2.

R is preferably an alkyl group having 1 to 30 carbon atoms or an aryl group having 6 to 30 carbon atoms, R is preferably an alkyl group having 1 to 30 carbon atoms or an aryl group having 6 to 30 carbon atoms, and more preferable are an alkyl group having 2 to 25 carbon atoms, phenyl group, nonylphenyl group, stearylphenyl group, 2,4-di-tert-butylpheny group, 2,4-di-tert-butylmethylphenyl group, tolyl group.

Examples of the phosphoric acid esters include trimethyl phosphate, triethyl phosphate, tributyl phosphate, trioctyl phosphate, triphenyl phosphate, tricresyl phosphate, tris (nonylphenyl) phosphate, 2-ethylphenyl diphenyl phosphate, tetrakis(2,4-di-tert-butylphenyl)-4,4-diphenylene-phosphonite and the like.

As the phosphorous acid ester, the compound represented by the following general formula (4) is preferable.

General formula (4)

(Compound 1)

in the general formula (4), R' is an alkyl group or an aryl group, and each may be the same or different.

R' is preferably an alkyl group having 1 to 25 carbon atoms, or an aryl group having 6 to 12 carbon atoms. When R' is an alkyl group, an alkyl group having 1 to 30 carbon atoms is preferable, and when R' is an aryl group, an aryl group having 6 to 30 carbon atoms is preferable.

Examples of the phosphorous acid esters include a triester, a diester, or a monoester of phosphorous acid such as triphenyl phosphite, trisnonylphenyl phosphite, tris(2,4-di-tert-butylphenyl) phosphite, trinonyl phosphite, tridecyl phosphite, trioctyl phosphite, trioctadecyl phosphite, distearylpentaerythritol diphosphite, tricyclohexyl phosphite, monobutyldiphenyl phosphite, monooctyldiphenyl phosphite, bis(2,4-di-tert-butylphenyl)pentaerythritol phosphite, bis(2,6-di-tert-4-methylphenyl)pentaerythritol phosphite, 2,2-methylenebis(4,6-di-tert-butylphenyl)octyl phosphite and the like.

When the resin composition of the present invention comprises the phosphorus-based stabilizer, a blending amount of the phosphorus-based stabilizer is 0.01 to 5 parts by weight, and more preferably 0.02 to 2 parts by weight relative to 100 parts by weight of the resin component.

The resin composition of the present invention may comprise only one kind of the phosphorus-based stabilizer, or may comprise two or more kinds. When comprising two or more of them, it is preferable that a total amount is within the above-mentioned range.

Antioxidant

The resin composition of the present invention may comprise an antioxidant. The antioxidant is preferably a phenol-based antioxidant, and includes more specifically, 2,6-di-t-butyl-4-methylphenol, n-octadecyl-3-(3',5'-di-t-butyl-4'-hydroxyphenyl) propionate, tetrakis[methylene-3-(3,5-di-t-butyl-4-hydroxyphenyl) propionate]methane, tris(3,5-di-t-butyl-4-hydroxybenzyl) isocyanurate, 4,4'-butylydenebis-(3-methyl-6-t-butylphenol), triethylene glycol-bis[3-(3-t-butyl-hydroxy-5-methylphenyl) propionate, and 3,9-bis{2-[3-(3-t-butyl-4-hydroxy-5-methylphenyl)propionyloxy]-1,1-dimethylethyl}-2,4,8,10-tetraoxaspiro[5.5]undecane, etc. Among them, preferable is tetrakis[methylene-3-(3,5-di-t-butyl-4-hydroxyphenyl) propionate] methane.

When the resin composition of the present invention comprises the antioxidant, a blending amount of the antioxidant is 0.01 to 5 parts by weight, and more preferably 0.05 to 3 parts by weight relative to 100 parts by weight of the resin component.

The resin composition of the present invention may comprise only one kind of the antioxidant, or may comprise two or more kinds. When comprising two or more of them, it is preferable that a total amount is within the above-mentioned range.

Mold-Releasing Agent

The resin composition of the present invention may comprise a mold-releasing agent. The mold-releasing agent is preferably at least one compound selected from an aliphatic carboxylic acid, an aliphatic carboxylic acid ester, and an aliphatic hydrocarbon compound having a number-average-molecular weight of 200 to 15000. Among them, at least one compound selected from the aliphatic carboxylic acid and the aliphatic carboxylic acid ester is more preferably used.

Specific examples of the aliphatic carboxylic acids include a saturated or unsaturated aliphatic mono-carboxylic acid, di-carboxylic acid or tri-carboxylic acid. In the present description, the term of the aliphatic carboxylic acid is used to encompass an alicyclic carboxylic acid. Among the aliphatic carboxylic acids, preferable is a mono- or di-carboxylic acid having 6 to 36 carbon atoms, more preferable is aliphatic saturated mono-carboxylic acid having 6 to 36 carbon atoms. Specific examples of such aliphatic carboxylic acids include palmitic acid, stearic acid, valeric acid, caproic acid, capric acid, lauric acid, arachic acid, behenic acid, lignoceric acid, cerotic acid, melissic acid, tetratriacontanoic acid, montanoic acid, glutaric acid, adipic acid, azelaic acid and the like.

As an aliphatic carboxylic acid component constituting the aliphatic carboxylic acid ester, there can be used the same aliphatic carboxylic acid as mentioned above. In contrast, as an alcohol component constituting the aliphatic carboxylic acid ester, there can be used a saturated or unsaturated mono-alcohol, a saturated or unsaturated polyhydric alcohol and the like. These alcohols may have a substituent such as a fluorine atom or an aryl group. Among these alcohols, preferable is a saturated mono- or polyhydric alcohol having 30 or less carbon atoms, and more preferable is a saturated aliphatic mono-alcohol or polyhydric-alcohol having 30 or less carbon atoms. Here, the aliphatic alcohol also includes an alicyclic alcohol. Specific examples of the alcohols include octanol, decanol, dodecanol, stearyl alcohol, behenyl alcohol, ethylene glycol, diethylene glycol, glycerin, pentaerythritol, 2,2-dihydroxy-perfluoropropanol, neopentylene glycol, ditrimethylolpropane, dipentaerythritol and the like. These aliphatic carboxylic acid esters may contain an aliphatic carboxylic acid and/or alcohol as a contaminant, and may be a mixture of a plurality of compounds. Specific examples of the aliphatic carboxylic acid esters include beeswax (mixture containing myricyl palmitate as a main component), stearyl stearate, behenyl behenate, octyldodecyl behenate, glycerin monopalmitate, glycerin monostearate, glycerin distearate, glycerin tristearate, pentaerythritol monopalmitate, pentaerythritol monostearate, pentaerythritol distearate, pentaerythritol tristearate, pentaerythritol tetrastearate and the like.

When the resin composition of the present invention comprises the mold-releasing agent, a blending amount of the mold-releasing agent is 0.01 to 5 parts by weight, and more preferably 0.05 to 3 parts by weight relative to 100 parts by weight of the resin component.

The resin composition of the present invention may comprise only one kind of the mold-releasing agent, or may comprise two or more kinds. When comprising two or more of them, it is preferable that a total amount is within the above-mentioned range.

The resin composition of the present invention may comprise other components within the scope not departing from the gist of the present invention. Examples of the other components include stabilizers other than the phosphorus-based stabilizer, ultraviolet absorbents, flame retardants, glass filler and inorganic filler other than talc, fluorescent whiteners, antidripping agents, antistatic agents, anticlouding agents, lubricants, antiblocking agents, flowability-improving agents, plasticizers, dispersing agents, antibacterial agents and the like. Two or more of these may be used together.

As to these components, the description of, for example, JP-A-2007-314766, JP-A-2008-127485, JP-A-2009-51989, and JP-A-2012-72338 and the like can be referred to, which are incorporated herein.

The method for preparing the polycarbonate resin composition of the present invention is not particularly defined, and known preparation methods of thermoplastic resin composition can be employed widely. Specifically, the resin composition can be prepared by previously mixing each component through the use of various mixers such as tumbler mixer, Henschel mixer, and then melt-molding with Banbury mixer, roll, Brabender, uniaxial kneading extruder, twin screw kneading extruder, kneader and the like.

Alternatively, for example, the resin composition of the present invention can be prepared by supplying through a feeder to an extruder without pre-mixing of each component or with pre-mixing of partial components, and melt-kneading.

Furthermore, for example, the resin composition of the present invention can also be prepared by pre-mixing a part of the components, supplying it to an extruder, performing melt-kneading to thereby obtain a resin composition that is set as a master batch, mixing again the master batch with the remaining components, and then performing melt-kneading.

The method for manufacturing the resin-molded article from the resin composition of the present invention is not particularly limited, and there can be employed molding method generally used in thermoplastic resins such as, namely, usual injection molding, super high speed injection molding, injection compression molding, two color molding, blow molding including gas-assist, molding by using a heat insulating die, molding by using a rapid heating die, foam molding (including supercritical fluid), insert molding, IMC (in-mold coating molding) molding, extrusion molding, sheet molding, heat molding, rotation molding, laminate molding, and press molding. In addition, there can be selected a molding method using hot-runner system.

Figure 1:
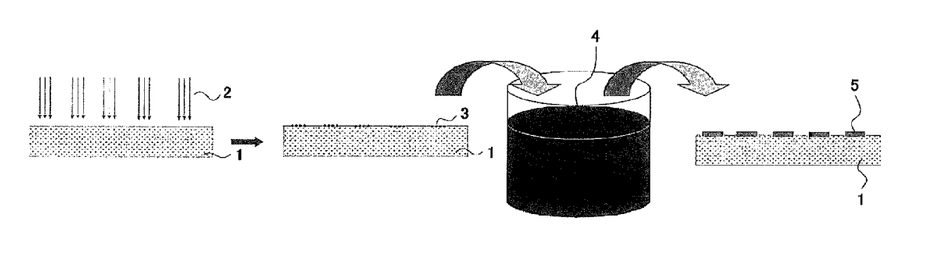
FIG. 1 is a schematic view showing a process of providing a plated layer on a surface of resin molded article.

Next, a process of providing a plated layer on the surface of the resin-molded article obtained by molding the resin composition of the present invention will be explained according to FIG. 1. FIG. 1 shows a schematic view of a process of forming a plated layer on a surface of a resin-molded article 1 by laser direct structuring technique. In FIG. 1, although the resin-molded article 1 is a flat substrate, the resin-molded article is not necessarily such a flat substrate, and may be partially or totally curved. The resin-molded article comprises not only final products but also various parts. The resin-molded article of the present invention is preferably a mobile electronic device part. The mobile electronic device parts have high impact resistance and rigidity together with excellent heat resistance, and have features of low anisotropy and low warpage, and thus, are extremely suitable for inside components and casing of PDA such as electronic organizer or portable computer; beeper; cellular phone; PHS; and the like. Particularly suitable is a flat plate-like mobile electronic device part having an average thickness excluding rib of 1.2 mm or less (lower limit is not particularly defined and, for example 0.4 mm or more), and among them, most suitable is the casing.

Returning to FIG. 1 again, the resin-molded article 1 is irradiated with laser 2. The laser herein is not particularly defined, and can be appropriately selected from known lasers such as YAG laser, excimer laser, electromagnetic radiations, and preferable is YAG laser. Moreover, a wavelength of the laser is not particularly defined. Preferred wavelength range is 200 nm to 1200 nm. Particularly preferable is 800 nm to 1200 nm.

When irradiated with laser, the resin-molded article 1 is activated at only the portion 3 irradiated with the laser. Under this activated condition, the resin-molded article 1 is applied to a plating solution 4. The plating solution 4 is not particularly defined, and known plating solutions can be employed widely, and, as a metal component, a component in which copper, nickel, gold, silver, or palladium is mixed is preferable, and a component in which copper is mixed is more preferable.

The method for applying the resin-molded article 1 to the plating solution 4 is not particularly defined, and, for example, there is a method for throwing the resin-molded article 1 into a liquid with which the plating solution 4 is blended. With respect to the resin-molded article after applying the plating solution, a plated layer 5 is formed only on the portion irradiated with the laser.

According to the method of the present invention, circuit lines having an interval width of 1 mm or less, further 150 μm or less (lower limit is not particularly defined and is, for example, 30 μM or more) can be formed. Such a circuit is preferably used as an antenna of mobile electronic device parts. Namely, one preferred embodiment of the resin-molded article of the present invention is a resin-molded article in which a plated layer provided on the surface of mobile electronic device parts has performance as an antenna.

Example

Hereinafter, the present invention will be more specifically explained by referring to Examples. Materials, amounts to be used, proportions, contents of treatment, procedures for treatment and the like described in the following Examples can be appropriately changed within a scope not departing the gist of the present invention. Accordingly, the scope of the present invention is not limited by the following specific examples.

Resin Component

S-3000F: Polycarbonate resin manufactured by Mitsubishi Engineering-Plastics Corporation
AT-08: ABS resin manufactured by NIPPON A&L Inc.

Glass Filler

T-595: Chopped strand with an average fiber diameter of 13 μm, an average fiber length of 3 mm, and use of a silicone resin as a sizing agent, manufactured by Nippon Electric Glass Co., Ltd.
3PE-936: Chopped strand with an average fiber diameter of 13 μm, an average fiber length of 3 mm, and use of polyethylene resin as a sizing agent, manufactured by Nitto Boseki Co., Ltd.
ECS307NA: Chopped strand with an average fiber diameter of 13 μm, an average fiber length of 3 mm, and use of polyethylene resin as a sizing agent, manufactured by CPIC Company.
MF-S-R: Milled fiber with an average fiber diameter of 10 μm, an average fiber length of 110 μm, surface-treated with a phosphorous acid, manufactured by ASAHI FIBER GLASS Co., Ltd.
MF06-JB1: Milled fiber with an average fiber diameter of 10 μm, an average fiber length of 70 μm, no surface-treated, manufactured by ASAHI FIBER GLASS Co., Ltd.
PFE301S: Milled fiber with an average fiber diameter of 10 μm, an average fiber length of 30 μm, surface-treated with acrylsilane, manufactured by Nitto Boseki Co., Ltd.
T-571: Chopped strand with 13 μm diameter, and use of an urethane resin as a sizing agent, manufactured by Nippon Electric Glass Co., Ltd.

LDS Additive

W-1: manufactured by Mitsubishi Materials Corporation antimony-doped tin oxide coated titanium oxide (titanium oxide 79% by weight, tin oxide 18% by weight, antimony oxide 3% by weight)

STOX-M: Comprising a mixture of antimony trioxide (antimony oxide 99.1% by weight, organosiloxane 0.5% by weight, lead oxide 0.05% by weight, cyan oxide 0.05% by weight) manufactured by NIHON SEIKO CO., LTD.

T-1: Comprising antimony-doped tin oxide (tin oxide 90.1% by weight, antimony oxide 9.9% by weight) manufactured by MITSUBISHI Material Corporation Talc 5000S: Hayashi-kasei co., JP Elastomer KANEACE M-711: Core/shell type elastomer including butadiene-based core and acrylic shell manufactured by KANEKA CORPORATION White Pigment Titanium oxide treated with methylhydrogenesiloxane manufactured by RESINO COLOR INDUSTRIES CO., LTD., Phosphorus-Based Stabilizer ADEKA Stub PEP-36:
Bis(2,6-di-tert-butyl-4-methylphenyl)pentaerythritol diphosphite manufactured by ADEKA CORPORATION
ADEKA Stub AX71: Mixture of approximately equal mole of (mono- and di-stearic acid phosphate) manufactured by ADEKA CORPORATION
ADEKA Stub PEP-8: (Cyclic neopentanetetrayl bis(octadecyl phosphite)) manufactured by ADEKA CORPORATION
ADEKA Stub ADK2112: Tris(2,4-di-tert-butylphenyl)phosphite manufactured by ADEKA CORPORATION Antioxidant Irganox 1076:
Octadecyl-3-(3,5-di-tert-butyl-4-hydroxyphenyl) propionate manufactured by BASF Mold-Releasing Agent VPG861: Pentaerythritol tetrastearate manufactured by Cognis Oleo Chemicals Japan Compound After weighting each component according to the formulations mentioned in the following Tables, and mixing with a tumbler for 20 minutes, the mixture was supplied to (TEX30HSST) with one bent manufactured by The Japan Steel Works, LTD., to knead under the conditions of a screw rotational speed of 200 rpm, discharge of 20 kg/hr, a barrel temperature of 300° C., and the molten resin extruded in the form of strand was cooled rapidly in a water tank, and then pelletized by using a pelletizer to obtain pellets of the resin composition.

Preparation of Test Piece—ISO Dumbbell Test Piece

After drying, at 120° C. for 5 hours, the pellets obtained by the above-mentioned preparation method, injection-molding was performed for the formation of ISO dumbbell test pieces having 4 mmt and 3 mmt, under the conditions of a cylinder temperature of 300° C., a die temperature of 100° C., a molding cycle of 50 seconds through the use of SG75-MII manufactured by Nissei Plastic Industrial Co., Ltd.

Preparation of Test Piece—Two-Stage Plate of 2 mmt/3 mmt

After drying, at 120° C. for 5 hours, the pellets obtained by the above-mentioned preparation method, injection-molding was performed for the formation of a two-stage plate of 2 mmt/3 mmt, under the conditions of a cylinder temperature of 300° C., a die temperature of 100° C., a molding cycle of 30 seconds through the use of J-50 manufactured by Nissei Plastic Industrial Co., Ltd.

Charpy Impact Strength

In accordance with ISO0179, through the use of the ISO dumbbell test piece having 3 mmt obtained by the above-mentioned method, a charpy impact strength with notches was measured under 23° C. The results are shown in the following Tables.

Plating Property (LDS Activity)—Plating Index

The laser irradiation of the surface of the two-stage plate of 2 mmt/3 mmt was performed by using YAG laser having a wavelength of 1064 nm under the condition of output power of 10 W, frequency of 80 kHz and rate of 3 m/s, and then the surface was subjected to electroless plating in a plating bath of M-Copper85 manufactured by MacDermid Co., Ltd. The LDS activity was evaluated depending on a thickness of the copper plaited layer, when the thickness of an electroless plating of the standard material is 1.0.

Dielectric Constant and Dielectric Tangent

A molded article of 100 mm square, 1 mm thickness was prepared through the use of an injection molding machine NEX80 manufactured by Nissei Plastic Industrial Co., Ltd. through a fine gate die. Test pieces of 1 mm×1 mm×100 mm were produced from the molded article in the flowing direction of resin (parallel) and in the direction perpendicular to the flowing direction of resin (perpendicularity).

These test pieces were subjected to measurement of dielectric constant and dielectric tangent at 2.45 GHz through the use of a cylindrical cavity resonator manufactured by Kanto Electric Application and Development Inc.

Hue—Gray Lightness

Through the use of a gray scale no-gloss plate manufactured by Mansell, lightness was measured by using a scale of W (white) to BK (black). Gray lightness was shown as the index of white.

Decomposition—MVR

After drying the resin composition pellets obtained above at 100° C. for 4 to 8 hours, a melt volume rate (MVR) was measured through the use of MELT INDEXER RF-F01 manufactured by TOYO SEIKI KOGYO CO., LTD. under a measuring temperature of 270° C., a load of 5 kgf. It can be said that the higher the MVR value is, the more the decomposition proceeds.

Decomposition—Post Heat-Aging MVR

After storing the resin composition pellets obtained above at 100° C. for one week, a melt volume rate (MVR) was measured through the use of MELTINDEXERF-F01 manufactured by TOYO SEIKI KOGYO CO., LTD. under a measuring temperature of 270° C., a load of 5 kgf. It can be said that the higher the MVR value is, the more the decomposition proceeds.

Decomposition—Moist-Heat Test MVR

After storing the resin composition pellets obtained above under the circumstance of 80° C., 95% relative humidity (RH) for one week, a melt volume rate (MVR) was measured through the use of MELTINDEXERF-F01 manufactured by TOYO SEIKI KOGYO CO., LTD. under a measuring temperature of 270° C., a load of 5 kgf. It can be said that the higher the MVR value is, the more the decomposition proceeds.

The results are shown in the following Tables. In the Tables, the blending amount is represented by parts by weight.

TABLE 1

| Kind | Name | Example 1 | Example 2 | Example 3 | Example 4 | Example 5 | Example 6 | Example 7 | Example 8 | Example 9 | Example 10 | Example 11 |
|---|---|---|---|---|---|---|---|---|---|---|---|---|
| PC | S-3000F | 100 | 100 | 100 | 60 | 60 | 60 | 60 | 60 | 60 | 60 | 60 |
| ABS | AT-08 | | | | 40 | 40 | 40 | 40 | 40 | 40 | 40 | 40 |
| Glass filler | T-595 | 11 | 25 | 43 | 11 | 25 | 43 | | | 43 | 43 | 43 |
| | 3PE-936 | | | | | | | | | | | |
| | ECS307NA | | | | | | | 43 | | | | |
| | MF-S-R | | | | | | | | 43 | | | |
| | MF06-JB1 | | | | | | | | | | | |
| | PFE301S | | | | | | | | | | | |
| | T-571 | | | | | | | | | | | |
| LDS additive | W-1 | 4 | 4 | 4 | 4 | 4 | 4 | 4 | 4 | 4 | 8 | 4 |
| | STOX-M | | | | | | | | | | | |
| | T-1 | | | | | | | | | | | |
| Talc | 5000s | | | | | | | | | 5 | | |
| Elastomer | M711 | 5 | 5 | 5 | 5 | 5 | 5 | 5 | 5 | 5 | 5 | 5 |
| White Pigment | Titanium oxide treated with methylhydrogenesiloxane | 2 | 2 | 2 | 2 | 2 | 2 | 2 | 2 | 2 | 2 | 2 |
| Phosphorus-based stabilizer | PEP-36 | 0.05 | 0.05 | 0.05 | 0.05 | 0.05 | 0.05 | 0.05 | 0.05 | 0.05 | 0.05 | |
| | AX71 | | | | | | | | | | | |
| | PEP-8 | | | | | | | | | | | 0.05 |
| | ADK2112 | | | | | | | | | | | |
| Antioxidant | Irganox1076 | 0.1 | 0.1 | 0.1 | 0.1 | 0.1 | 0.1 | 0.1 | 0.1 | 0.1 | 0.1 | 0.1 |
| Mold-releasing agent | VPG861 | 0.3 | 0.3 | 0.3 | 0.3 | 0.3 | 0.3 | 0.3 | 0.3 | 0.3 | 0.3 | 0.3 |
| Mechanical property | Charpy impact strength | 35 | 30 | 20 | 29 | 20 | 13 | 13 | 13 | 9 | 10 | 11 |
| Plating property | Plating Index | 0.7 | 0.8 | 0.85 | 0.8 | 0.85 | 0.9 | 0.9 | 0.9 | 1 | 1 | 0.9 |
| Hue | Gray lightness | 8 | 8 | 8 | 8 | 8 | 8 | 8 | 8 | 8 | 7 | 8 |
| Decomposition | MVR | 16 | 14 | 12 | 26 | 18 | 13 | 13 | 13 | 15 | 15 | 13 |
| | Post heat-aging MVR | 18 | 16 | 13 | 28 | 20 | 15 | 14 | 15 | 18 | 18 | 14 |
| | Moist-heat test MVR | 19 | 17 | 15 | 29 | 22 | 16 | 16 | 16 | 20 | 20 | 15 |

TABLE 2

| Kind | Name | Example 12 | Example 13 | Example 14 | Example 15 | Comp. Example 1 | Comp. Example 2 | Comp. Example 3 | Comp. Example 4 | Comp. Example 5 | Comp. Example 6 |
|---|---|---|---|---|---|---|---|---|---|---|---|
| PC | S-3000F | 60 | 60 | 60 | 60 | 100 | 100 | 60 | 60 | 60 | 60 |
| ABS | AT-08 | 40 | 40 | 40 | 40 | | | 40 | 40 | 40 | 40 |
| Glass filler | T-595 | 43 | 43 | 43 | 43 | | | | | 25 | 25 |
| | 3PE-936 | | | | | | | | | | |
| | ECS307NA | | | | | | | | | | |
| | MF-S-R | | | | | | | | | | |
| | MF06-JB1 | | | | | | | | | | |
| | PFE301S | | | | | | | | | | |
| | T-571 | | | | | 25 | 25 | 25 | 25 | | |
| LDS additive | W-1 | 4 | 4 | 4 | 4 | | | | | | |
| | STOX-M | | | | | 4 | | 4 | | 4 | |
| | T-1 | | | | | | 4 | | 4 | | 4 |
| Talc | 5000s | | | | | | | | | | |
| Elastomer | M711 | 5 | 5 | 5 | 5 | 5 | 5 | 5 | 5 | 5 | 5 |

TABLE 2-continued

| Kind | Name | Example 12 | Example 13 | Example 14 | Example 15 | Comp. Example 1 | Comp. Example 2 | Comp. Example 3 | Comp. Example 4 | Comp. Example 5 | Comp. Example 6 |
|---|---|---|---|---|---|---|---|---|---|---|---|
| White Pigment | Titanium oxide treated with methylhydrogenesiloxane | 2 | 2 | 2 | 2 | 3 | 3 | 3 | 3 | 2 | 2 |
| Phosphorus-based stabilizer | PEP-36 | | | | | 0.05 | 0.05 | 0.05 | 0.05 | 0.05 | 0.05 |
| | AX71 | | | | | | | | | | |
| | PEP-8 | 0.05 | | | | | | | | | |
| | ADK2112 | | | | 0.05 | | | | | | |
| Antioxidant | Irganox1076 | 0.1 | | 0.1 | 0.1 | 0.1 | 0.1 | 0.1 | 0.1 | 0.1 | 0.1 |
| Mold-releasing agent | VPG861 | 0.3 | 0.3 | 0.3 | 0.3 | 0.3 | 0.3 | 0.3 | 0.3 | 0.3 | 0.3 |
| Mechanical property | Charpy impact strength | 13 | 13 | 13 | 13 | 10 | 10 | 8 | 8 | 20 | 20 |
| Plating property | Plating Index | 0.9 | 0.9 | 0.9 | 0.9 | 0.1 | 0.1 | 0.1 | 0.1 | 0.2 | 0.2 |
| Hue | Gray lightness | 8 | 8 | 8 | 8 | 5 | 4 | 5 | 4 | 8 | 8 |
| Decomposition | MVR | 13 | 16 | 15 | 14 | 15 | 15 | 23 | 24 | 18 | 18 |
| | Post heat-aging MVR | 15 | 29 | 24 | 24 | 17 | 17 | 25 | 25 | 20 | 20 |
| | Moist-heat test MVR | 16 | 35 | 34 | 28 | 18 | 18 | 26 | 26 | 22 | 22 |

TABLE 3

| Kind | Name | Example 16 | Example 17 | Example 18 | Example 19 | Example 20 | Example 21 | Example 22 | Example 23 | Example 24 | Example 25 |
|---|---|---|---|---|---|---|---|---|---|---|---|
| PC | S-3000F | 100 | 100 | 100 | 60 | 60 | 60 | 60 | 60 | 60 | 60 |
| ABS | AT-08 | | | | 40 | 40 | 40 | 40 | 40 | 40 | 40 |
| Glass filler | T-595 | | | | | | | | | | |
| | 3PE-936 | | | | | | | | | | |
| | ECS307NA | | | | | | | | | | |
| | MF-S-R | 11 | 25 | 43 | 11 | 25 | 43 | | | 43 | 43 |
| | MF06-JB1 | | | | | | | 43 | | | |
| | PFE301S | | | | | | | | 43 | | |
| | T-571 | | | | | | | | | | |
| LDS additive | W-1 | 4 | 4 | 4 | 4 | 4 | 4 | 4 | 4 | 4 | 8 |
| | STOX-M | | | | | | | | | | |
| | T-1 | | | | | | | | | | |
| | 5000s | | | | | | | | | 5 | |
| Elastomer | M711 | 5 | 5 | 5 | 5 | 5 | 5 | 5 | 5 | 5 | 5 |
| White Pigment | Titanium oxide treated with methylhydrogenesiloxane | 2 | 2 | 2 | 2 | 2 | 2 | 2 | 2 | 2 | 2 |
| Phosphorus-based stabilizer | PEP-36 | 0.05 | 0.05 | 0.05 | 0.05 | 0.05 | 0.05 | 0.05 | 0.05 | 0.05 | 0.05 |
| | AX71 | | | | | | | | | | |
| | PEP-8 | | | | | | | | | | |
| | ADK2112 | | | | | | | | | | |
| Antioxidant | Irganox1076 | 0.1 | 0.1 | 0.1 | 0.1 | 0.1 | 0.1 | 0.1 | 0.1 | 0.1 | 0.1 |
| Mold-releasing agent | VPG861 | 0.3 | 0.3 | 0.3 | 0.3 | 0.3 | 0.3 | 0.3 | 0.3 | 0.3 | 0.3 |
| Mechanical property | Charpy impact strength | 10 | 13 | 15 | 9 | 11 | 12 | 12 | 11 | 7 | 13 |
| Plating property | Plating Index | 0.5 | 0.55 | 0.6 | 0.6 | 0.65 | 0.7 | 0.7 | 0.75 | 0.8 | 0.8 |
| Dielectric constant 2.45 GHz | Paralell | 2.8 | 2.98 | 3.16 | 2.78 | 2.96 | 3.14 | 3.14 | 3.14 | 3.16 | 3.26 |
| | Perpendicularity | 2.8 | 2.98 | 3.16 | 2.78 | 2.96 | 3.14 | 3.14 | 3.14 | 3.16 | 3.26 |
| Dielectric tangent 2.45 GHz | Parallel | 0.006 | 0.007 | 0.008 | 0.006 | 0.007 | 0.008 | 0.008 | 0.008 | 0.008 | 0.009 |
| | perpendicularity | 0.006 | 0.007 | 0.008 | 0.006 | 0.007 | 0.008 | 0.008 | 0.008 | 0.008 | 0.009 |
| Hue | Gray lightness | 8 | 8 | 8 | 8 | 8 | 8 | 8 | 8 | 8 | 7.5 |
| Decomposition | MVR | 16 | 14 | 12 | 25 | 22 | 18 | 20 | 22 | 23 | 23 |
| | Post heat-aging MVR | 18 | 16 | 14 | 27 | 24 | 20 | 22 | 23 | 25 | 25 |
| | Moist-heat test MVR | 19 | 17 | 15 | 28 | 25 | 21 | 23 | 24 | 29 | 30 |

TABLE 4

| Kind | Name | Example 26 | Example 27 | Example 28 | Example 29 | Example 30 | Comp. Example 7 | Comp. Example 8 |
|---|---|---|---|---|---|---|---|---|
| PC | S-3000F | 60 | 60 | 60 | 60 | 60 | 60 | 60 |
| ABS | AT-08 | 40 | 40 | 40 | 40 | 40 | 40 | 40 |
| Glass filler | T-595 | | | | | | | |
| | 3PE-936 | | | | | | | |
| | ECS307NA | | | | | | | |
| | MF-S-R | 43 | 43 | 43 | 43 | 43 | 43 | 43 |
| | MF06-JB1 | | | | | | | |
| | PFE301S | | | | | | | |
| | T-571 | | | | | | | |
| LDS additive | W-1 | 4 | 4 | 4 | 4 | 4 | | |
| | STOX-M | | | | | | 4 | |
| | T-1 | | | | | | | 4 |
| | 5000s | | | | | | | |
| Elastomer | M711 | 5 | 5 | 5 | 5 | 5 | 5 | 5 |
| White Pigment | Titanium oxide treated with methylhydrogenesiloxane | 2 | 2 | 2 | 2 | 2 | 2 | 2 |
| Phosphorus-based stabilizer | PEP-36 | | | | | | 0.05 | 0.05 |
| | AX71 | 0.05 | | | | | | |
| | PEP | | 0.05 | | | | | |
| | ADK2112 | | | | | 0.05 | | |
| Antioxidant | Irganox1076 | 0.1 | 0.1 | | 0.1 | 0.1 | 0.1 | 0.1 |
| Mold-releasing agent | VPG861 | 0.3 | 0.3 | 0.3 | 0.3 | 0.3 | 0.3 | 0.3 |
| Mechanical property | Charpy impact strength | 11 | 12 | 12 | 12 | 12 | 12 | 12 |
| Plating property | Plating Index | 0.7 | 0.7 | 0.7 | 0.7 | 0.7 | 0.2 | 0.2 |
| Dielectric constant 2.45 GHz | Paralell | 3.14 | 3.14 | 3.14 | 3.14 | 3.14 | 3.33 | 2.96 |
| | Perpendicularity | 3.14 | 3.14 | 3.14 | 3.14 | 3.14 | 3.33 | 2.96 |
| Dielectric tangent 2.45 GHz | Parallel | 0.008 | 0.008 | 0.008 | 0.008 | 0.008 | 0.008 | 0.011 |
| | perpendicularity | 0.008 | 0.008 | 0.008 | 0.008 | 0.008 | 0.008 | 0.011 |
| Hue | Gray lightness | 8 | 8 | 8 | 8 | 8 | 4 | 5 |
| Decomposition | MVR | 18 | 18 | 20 | 20 | 19 | 26 | 24 |
| | Post heat-aging MVR | 19 | 20 | 30 | 28 | 25 | 27 | 26 |
| | Moist-heat test MVR | 20 | 22 | 35 | 35 | 33 | 28 | 27 |

As is clear from the above Tables, it has been found that the resin composition of the present invention is excellent in plating property. In contrast, the compositions of Comparative Examples were not able to exhibit sufficient plating property. Furthermore, it has been found that the resin composition of the present invention is excellent in mechanical properties, excellent in hue, and is hard to be decomposed. That is, according to the resin composition of the present invention, it has been found that the plating property can be enhanced with maintaining various performances.

The present disclosure relates to the subject matter contained in Japanese Patent Application No. 203366/2012 filed on Sep. 14, 2012, which is expressly incorporated herein by reference in their entirety. All the publications referred to in the present specification are also expressly incorporated herein by reference in their entirety.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined claims set forth below.

The invention claimed is:

1. A resin composition for laser direct structuring, comprising, relative to 100 parts by weight of a resin component comprising 30 to 100% by weight of a polycarbonate resin and 70% by weight or less of a styrene-based resin, 10 to 100 parts by weight of a glass filler and 2 to 20 parts by weight of a laser direct structuring additive,
wherein the laser direct structuring additive comprises a metal oxide particle comprising titanium oxide coated with a composition comprising tin as a main component and antimony, and wherein a content of titanium oxide in the metal oxide particle comprising titanium oxide is 90% by weight or more.

2. The resin composition for laser direct structuring according to claim 1,
wherein the composition is a composition comprising 50% by weight or more of tin and 1 to 30% by weight of antimony, as a metal component.

3. The resin composition for laser direct structuring according to claim 1,
wherein the laser direct structuring additive comprises 70 to 95% by weight of tin oxide and 5 to 30% by weight of antimony oxide.

4. The resin composition for laser direct structuring according to claim 1,
wherein the glass filler is a glass fiber having an average fiber length of 200 μm or less.

5. The resin composition for laser direct structuring according to claim 1,
wherein the glass filler is coated with at least one sizing agent selected from the group consisting of a polyolefin resin and a silicone resin.

6. The resin composition for laser direct structuring according to claim 1, comprising styrene resin in an amount of 10% by weight or more as a resin component.

7. The resin composition for laser direct structuring according to claim 1, further comprising an elastomer and/or a phosphorus-based stabilizer.

8. A resin-molded article obtained by molding the laser direct structuring composition according to claim 1.

9. The resin-molded article according to claim 8, further comprising a plated layer on a surface of the article.

10. The resin-molded article according to claim 8, which is a mobile electronic device part.

11. The resin-molded article according to claim 9, wherein the plated layer has a performance as an antenna.

12. A method for manufacturing a resin-molded article with a plated layer, comprising irradiating the surface of a resin-molded article, obtained by molding the thermoplastic resin composition according to claim 1, with a laser, and then applying a metal to form the plated layer.

13. The method for manufacturing a resin-molded article with a plated layer according to claim 12, wherein the plating is copper plating.

14. A method for manufacturing a mobile electronic device part having an antenna, comprising the method for manufacturing a resin-molded article with a plated layer according to claim 12.

15. The resin composition for laser direct structuring according to claim 2,
wherein the laser direct structuring additive comprises 70 to 95% by weight of tin oxide and 5 to 30% by weight of antimony oxide.

16. The resin composition for laser direct structuring according to claim 2,
wherein the glass filler is a glass fiber having an average fiber length of 200 μm or less.

17. The resin composition for laser direct structuring according to claim 3,
wherein the glass filler is a glass fiber having an average fiber length of 200 μm or less.

* * * * *